United States Patent
Mori et al.

(10) Patent No.: US 7,695,076 B2
(45) Date of Patent: Apr. 13, 2010

(54) VEHICLE BRAKE CONTROL DEVICE

(75) Inventors: Yukio Mori, Kariya (JP); Koichi Kokubo, Kariya (JP)

(73) Assignee: Advics Co., Ltd., Aichi-pref. (JP)

( * ) Notice: Subject to any disclaimer, the term of this patent is extended or adjusted under 35 U.S.C. 154(b) by 865 days.

(21) Appl. No.: 11/402,879

(22) Filed: Apr. 13, 2006

(65) Prior Publication Data

US 2006/0238025 A1     Oct. 26, 2006

(30) Foreign Application Priority Data

Apr. 21, 2005    (JP)    ............................. 2005-123417

(51) Int. Cl.
    *B60T 8/32*    (2006.01)
(52) U.S. Cl. ...................... 303/192; 303/112
(58) Field of Classification Search ................. 303/143, 303/144, 186–192, 112, 113.1
    See application file for complete search history.

(56) References Cited

U.S. PATENT DOCUMENTS

| 6,089,677 | A | 7/2000 | Funkumura et al. |
| 6,302,823 | B1 | 10/2001 | Eckert et al. |
| 6,547,344 | B2 * | 4/2003 | Hada et al. .................. 303/191 |
| 2003/0225501 | A1 | 12/2003 | De La Salle et al. |
| 2004/0215385 | A1 | 10/2004 | Aizawa et al. |
| 2004/0256912 | A1 | 12/2004 | Hamada et al. |

FOREIGN PATENT DOCUMENTS

| JP | A-H08-230649 | 9/1996 |
| JP | A-2003-264905 | 9/2003 |
| JP | A-2004-090679 | 3/2004 |
| KR | 10-236893 B | 1/2000 |

OTHER PUBLICATIONS

Notification to Submit Written Statement of Arguments (with English translation) issued on Jul. 18, 2007 in counterpart Korean App. No. 10-2006-35167.
Chinese Office Action dated Aug. 17, 2007 in corresponding Chinese patent application No. 200610077110.3 (English translation only).
Office Action dated Oct. 27, 2009 from the German Patent and Trademark Office in the corresponding patent application No. 10 2006 000 185.0-21 (English translation enclosed).
Office Action dated Oct. 29, 2009 from the Japan Patent Office in the corresponding patent application No. 2005-123417 (English translation enclosed).

* cited by examiner

*Primary Examiner*—Xuan Lan Nguyen
(74) *Attorney, Agent, or Firm*—Posz Law Group, PLC (57) ABSTRACT

Based on whether a requisite braking torque is less than a drive torque of the driving wheel, braking force is generated for only driving wheels, or braking force is generated for driven wheels, in addition to that for the driving wheels. Thus, it is possible to maintain the creep speed to the target speed and achieve a suitable front and rear braking force distribution on downward slope roads where a gravity impellent is acting on the vehicle, as well as on flat roads and upward slope roads. The ability to achieve such a suitable front and rear braking force distribution ensures that the driven wheels will not easily lock up on a low μ road surface or the like.

8 Claims, 4 Drawing Sheets

VEHICLE BRAKE CONTROL DEVICE

CROSS REFERENCE TO RELATED APPLICATION

This application is based upon and claims the benefit of Japanese Patent Application No. 2005-123417 filed on Apr. 21, 2005, the content of which are incorporated herein by reference.

FIELD OF THE INVENTION

The present invention relates to a vehicle brake control device, which is applied to a vehicle capable of creeping.

BACKGROUND OF THE INVENTION

A vehicle brake control device is proposed in Japanese Patent Application Publication No. JP-A-2004-90679. The vehicle brake control device sets a target vehicle speed depending on a creep condition during creeping and changes the target vehicle speed depending on various conditions, such as vehicle running conditions, road surface conditions, and driving operations, in order to realize suitable creeping.

According to the vehicle brake control device described above, braking force must be generated for each wheel in order to set a creep speed to the target vehicle speed.

However, in cases where the vehicle is traveling on a low $\mu$ road surface (i.e., road surfaces with a low surface friction coefficient $\mu$), for example, tendency in which driven wheels are locked will easily be greater if braking force is simply generated for each wheel.

In other words, when the braking forces are generated for each wheel, it can be considered that they may be generated by applying identical W/C pressures to respective wheels. In such case, creep torque is generated for driving wheels only, so there is a different distribution of braking force for the driving wheels and the driven wheels. For this reason, greater braking forces are distributed to the driven wheels on which creep torques are not generated compared to the driving wheels. Therefore, a balance of front and rear braking forces balance becomes unstable, and results in locking up of the driven wheels.

Such a problem becomes especially apparent during times of faster idling, such as immediately after the engine is started and while the air conditioner is running.

In addition, ABS control cannot be executed at low speeds due to the lowered accuracy of a wheel speed sensor. More suitable braking force distribution control is therefore needed in order to fully exploit a side force between the tires and the road surface when inputted braking force is transmitted to the road surface.

SUMMARY OF THE INVENTION

It is an object of the present invention to provide a vehicle brake control device capable of setting a suitable distribution of braking force to each wheel such that an easy lock-up tendency of a specific wheel on a low $\mu$ road surface or the like does not occur.

It is a further object of the present invention to provide a vehicle brake control device capable of maintaining a creep speed to a target speed.

According to the present invention, a vehicle brake control device has a control unit for including a vehicle body speed detection unit that detects a vehicle body speed; and a target speed setting unit that sets a target speed for the vehicle body speed. The control unit also includes a requisite braking torque calculation unit that calculates a requisite braking torque, which is required as a braking torque to be generated by the braking force generation unit, such that the vehicle body speed detected by the vehicle body speed detection unit reaches the target speed set by the target speed setting unit. The control unit further includes an engine torque detection unit that detects an engine torque transmitted to driving wheels among respective wheels; a driving wheel drive torque conversion unit that converts the engine torque detected by the engine torque detection unit into a driving wheel drive torque that is applied to the driving wheels; and a braking torque distribution setting unit for the respective wheels that sets a distribution of the requisite braking torque to the respective wheels depending on a magnitude of the driving wheel drive torque calculated by the driving wheel drive torque conversion unit. In addition, a control signal is output to a brake control actuator so as to achieve a distribution of the requisite braking torque to the respective wheels as set by the braking torque distribution setting units for the respective wheels.

In this manner, a distribution of the requisite braking torque to the respective wheels is set based on whether the requisite braking torque is less than the driving wheel drive torque. Accordingly, it is possible to maintain the creep speed to the target speed and achieve a suitable braking force distribution for the respective wheels on downward slope roads where a gravity impellent is acting on the vehicle, as well as on flat roads and upward slope roads. The ability to achieve such a suitable braking force distribution for the respective wheels ensures that the driven wheels will not easily lock up on a low $\mu$ road surface or the like.

In the present invention, the braking torque distribution setting units for the respective wheels include a comparison unit that determines whether the requisite braking torque is less than the driving wheel drive torque. If the comparison unit determines that the requisite braking torque is less than the drive torque of the driving wheel, then the requisite braking torque is distributed to only the driving wheels among the respective wheels. If the comparison unit determines that the requisite braking torque is equal to or greater than the drive torque of the driving wheel, then an amount of the drive torque of the driving wheel among the requisite braking torque is distributed to the driving wheels, while an amount excluding the drive torque of the driving wheel among the requisite braking torque is distributed to the driving wheels and also to driven wheels.

According to the present invention, the brake control actuator is assumed as an actuator for brake fluid pressure control that is provided with a hydraulic circuit. The hydraulic circuit transmits a brake fluid pressure from a brake fluid pressure generation source, which generates brake fluid pressure in accordance with operation of the brake operation member, to W/Cs.

In this case, the hydraulic circuit includes a first brake system that controls a brake fluid pressure to W/Cs corresponding to the driving wheels, and a second brake system that controls a brake fluid pressure to W/Cs corresponding to the driven wheels. The first brake system is provided with a first differential pressure control valve that is configured by an electromagnetic valve that generates a differential brake fluid pressure between the brake fluid pressure generation source and the W/Cs corresponding to the driving wheels. The second brake system is provided with a second differential pressure control valve that is configured by an electromagnetic valve that generates a differential brake fluid pressure between the brake fluid pressure generation source and the W/Cs corresponding to the driven wheels. In addition, the differential pressure to be generated can be increased in accordance with an increase in current values of the first and second differential pressure control valves.

Accordingly, the electronic control unit can apply to the first differential pressure control valve a current with a current value greater than that for the second differential pressure control valve as a control signal, so as to generate a braking torque for the driving wheels that is greater than that for the driven wheels.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

The present invention will be described further with reference to various embodiments in the drawings.

Hereinafter, embodiments of the present invention will be described with reference to the drawings.

First Embodiment

Figure 1:
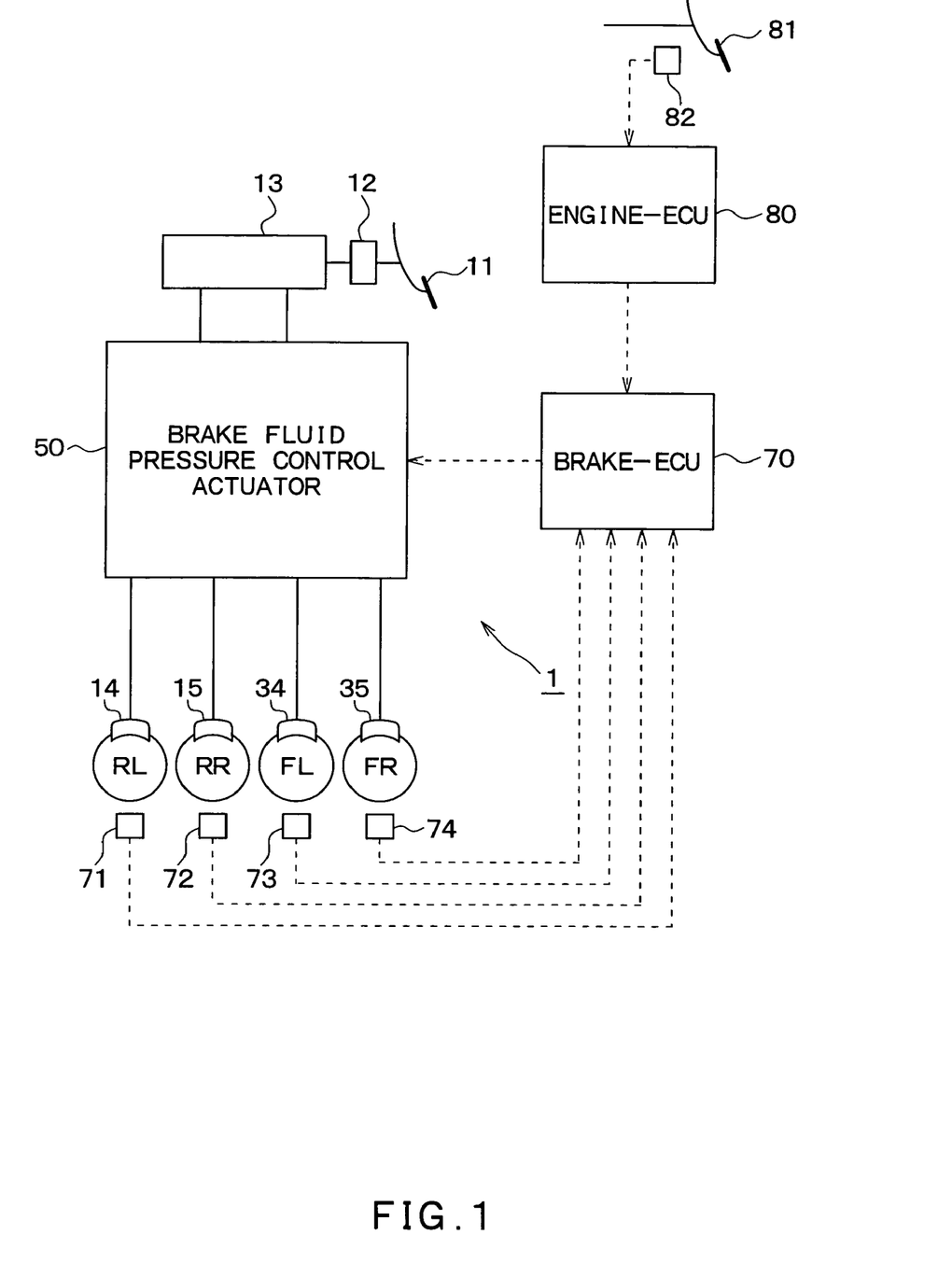
FIG. 1 is a block diagram of a vehicle brake control device according to a first embodiment of the present invention.

FIG. 1 is a block diagram of a vehicle brake control device 1 according to a first embodiment. The vehicle brake control device 1 shown in the present embodiment may be applied to any one of a front-wheel drive vehicle, a rear-wheel drive vehicle, and a four-wheel drive vehicle. However, the present embodiment illustrates an example where the vehicle brake control device 1 is applied to a rear-wheel drive vehicle. The configuration of the vehicle brake control device 1 of the present embodiment will be described with reference to FIG. 1.

Figure 2:
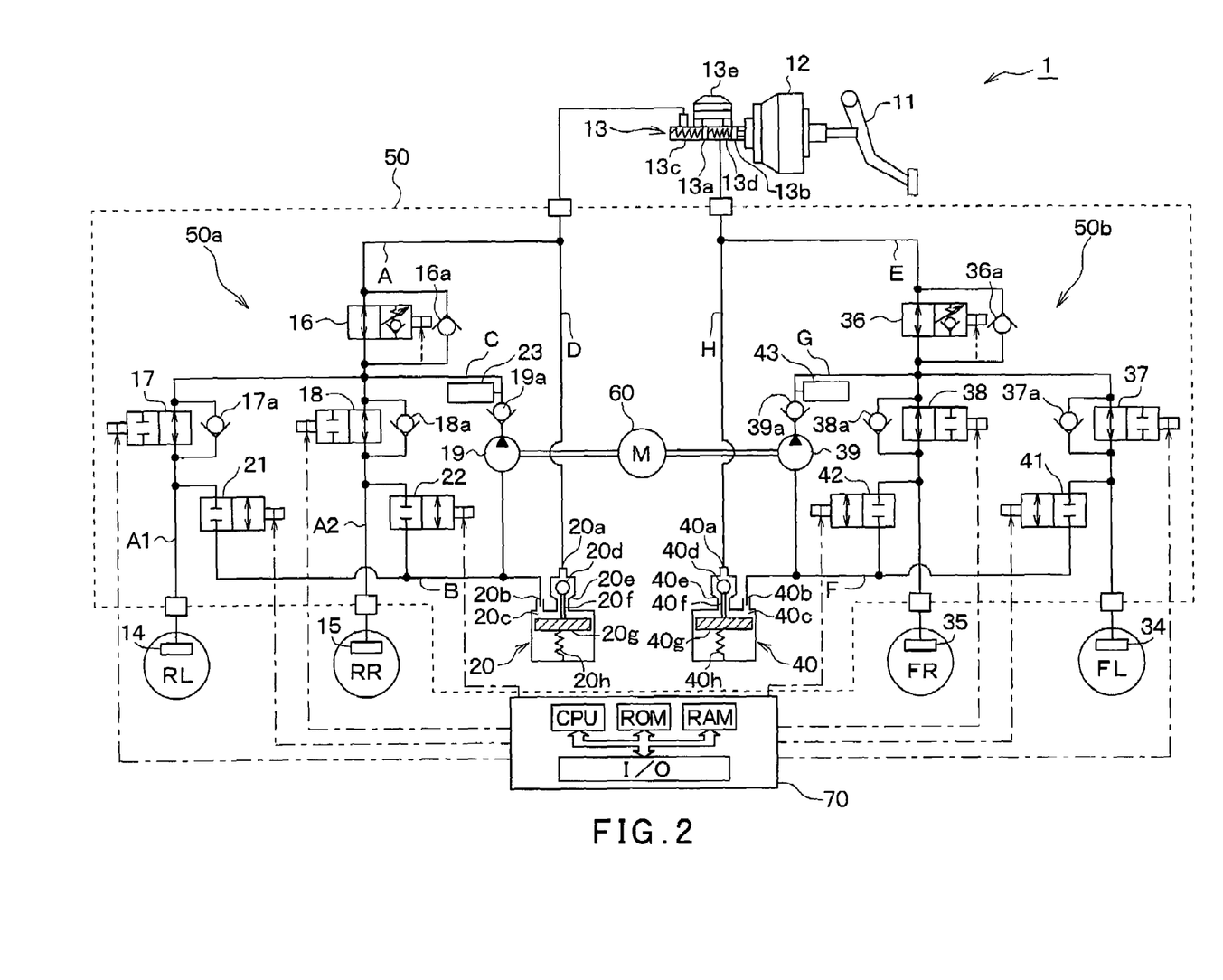
FIG. 2 is a drawing illustrating the detailed structure of each portion provided in the vehicle brake control device shown in FIG. 1.

As shown in FIG. 1, the vehicle brake control device 1 includes a brake pedal 11; a brake booster 12; a master cylinder (hereinafter referred to as M/C) 13; wheel cylinders (hereinafter referred to as W/Cs) 14, 15, 34, 35 corresponding to a braking force generating mechanism; an brake fluid pressure control actuator 50; and a brake ECU 70. FIG. 2 shows the structures of these portions in detail.

As shown in FIG. 2, the brake pedal 11 functions as a brake operation member that is depressed by a driver to apply braking force to the vehicle. The brake pedal 11 is connected to the brake booster 12, which is a brake fluid pressure generation source, and the M/C 13. When the brake pedal 11 is depressed by the driver, the depression force is boosted by the brake booster 12, and pushes master pistons 13a, 13b that are disposed in the M/C 13. Accordingly, an identical M/C pressure is generated for a primary chamber 13c and a secondary chamber 13d defined by the master pistons 13a, 13b.

The M/C 13 includes a master reservoir 13e, which has passages in respective communication with the primary chamber 13c and the secondary chamber 13d. The master reservoir 13e delivers brake fluid to the M/C 13 via such passages, and accumulates excessive brake fluid inside the M/C 13. Note that the passages are formed with an extremely small diameter, one that is smaller than the diameters of the main conduits extending from the primary chamber 13c and the secondary chamber 13d. Therefore, an orifice effect can be obtained when brake fluid flows toward the master reservoir 13e from the primary chamber 13c and secondary chamber 13d side of the M/C 13.

M/C pressure generated by the M/C 13 is transmitted to the W/Cs 14, 15, 34, 35 via the brake fluid pressure control actuator 50.

The brake fluid pressure control actuator 50 is configured with a first brake system 50a and a second brake system 50b. The first brake system 50a controls brake fluid pressure applied to a rear left wheel RL and a rear right wheel RR, which are driving wheels. The second brake system 50b controls brake fluid pressure applied to a front left wheel FL and a front right wheel FR, which are driven wheels. A front-rear split brake system is configured by two brake conduits of the first and second brake systems 50a, 50b.

The configuration of the first and second brake systems 50a, 50b will be described hereinafter. Note that since the structures of the first and second brake systems 50a, 50b are substantially identical, the first brake system 50a is described below, whereas a description of the second brake system 50b is omitted by way of reference to the first brake system 50a.

The first brake system 50a includes a conduit A functioning as a main conduit for transmitting the M/C pressure mentioned above to the W/C 14 provided in the rear left wheel RL and to the W/C 15 provided in the rear right wheel RR. W/C pressures are respectively generated in the W/Cs 14, 15 via the main conduit A.

The conduit A includes a first differential pressure control valve 16 that is configured by an electromagnetic valve capable of being controlled to two positions, an open state and a differential pressure state. The valve position of the first differential pressure control valve 16 is set to the open state during normal braking, and is set to the differential pressure state when electricity is supplied to a solenoid coil. In addition, a differential pressure value formed by the first differential pressure control valve 16 is dependent on a current value of an electric current flowing through the solenoid coil, such that the differential pressure value increases as the current value increases.

At the differential pressure valve position of the first differential pressure control valve 16, only the flow of brake fluid from the W/Cs 14, 15 side to the M/C 13 side is allowed at times when the brake fluid pressure on the W/Cs 14, 15 side increases a predetermined amount or more over the M/C pressure. Therefore, the W/Cs 14, 15 side is constantly maintained so as not to reach a predetermined pressure or more over the M/C 13 side, whereby the respective passages are protected.

The conduit A branches into two conduits A1, A2 at farther downstream on the W/Cs 14, 15 side than the first differential pressure control valve 16. One of the two conduits A1, A2 has a first pressure increase control valve 17 that controls an increase in the brake fluid pressure to the W/C 14, whereas the other has a second pressure increase control valve 18 that controls an increase in the brake fluid pressure to the W/C 15.

The first and second pressure increase control valves 17, 18 are configured by electromagnetic valves functioning as two-way valves that can be controlled to open and closed states. When the first and second pressure increase control valves 17, 18 are controlled to the open state, the M/C pressure or a brake fluid pressure based on the discharge of brake fluid from a pump 19 to be described later can be applied to the W/Cs 14, 15.

Note that during normal braking in which a braking force is generated based on an operation the brake pedal 11 by the driver, the first differential pressure control valve 16 and the first and second pressure increase control valves 17, 18 are constantly controlled to the open state.

In addition, the first differential pressure control valve 16, and the first and second pressure increase control valves 17, 18 are respectively provided with check valves 16a, 17a, 18a in parallel. The check valve 16a of the first differential pressure control valve 16 is provided in order to enable the transmission of M/C pressure to the W/Cs 14, 15 in cases where the brake pedal 11 is depressed by the driver when the valve position of the first differential pressure control-valve 16 is set to the differential pressure state. Furthermore, the check valves 17a, 18a of the first and second pressure increase control valves 17, 18 are provided in order to enable a decrease in the W/C pressure of the rear left wheel RL and the rear right wheel RR in response to release of the brake pedal 11 by the driver, especially during ABS control when the pressure increase control valves 17, 18 are controlled to the closed state.

A conduit B functioning as a pressure decrease conduit connects a pressure regulating reservoir 20 and a portion of the conduit A between the first and second pressure increase control valves 17, 18 and the W/Cs 14, 15. A first pressure decrease control valve 21 and a second pressure decrease control valve 22 respectively disposed on the conduit B. The pressure decrease control valves 21, 22 are formed from electromagnetic valves, and function as two-way valves capable of being controlled to open and closed states. The first and second pressure decrease control valves 21, 22 are constantly controlled to the closed state during normal braking.

A conduit C functioning as a recirculation conduit is disposed so as to connect the pressure regulating reservoir 20 and the conduit A, which is a main conduit. The conduit C is provided with a self-priming pump 19 that is driven by a motor 60 so as to intake brake fluid from the pressure regulating reservoir 20 and discharge it toward the M/C 13 side or the W/Cs 14, 15 sides.

A check valve 19a is provided on a discharge port side of the pump 19 so that high pressure brake fluid is not applied to the pump 19. Also, a fixed displacement damper 23 is arranged on the discharge side of the pump 19 in the brake conduit C in order to reduce the pulsation of the brake fluid discharged by the pump 19.

A brake conduit D is also provided as an auxiliary brake conduit which connects the M/C 13 with the pressure regulating reservoir 20. By sucking brake fluid up with the pump 19 from the M/C 13 through this brake conduit D and discharging it to the brake conduit A, the brake fluid can be supplied to the W/C 14 and 15 side during TCS control and ABS control and the like, thereby enabling the W/C pressure of the wheel to be controlled to increase.

The pressure regulating reservoir 20 has a reservoir hole 20a and a reservoir hole 20b. The reservoir hole 20a is connected to the brake conduit D and is used to receive brake fluid from the M/C 13 side. The reservoir hole 20b is connected to the brake conduits B and C and is used to receive brake fluid that escapes from the W/Cs 14 and 15 as well as to supply brake fluid to the suction port side of the pump 19. Both the reservoir hole 20a and the reservoir hole 20b are connected to a reservoir chamber 20c. A ball valve 20d is provided to the inside of the reservoir hole 20a. A rod 20f, which has a predetermined stroke for moving the ball valve 20d up and down, is provided separately in the ball valve 20d.

Further, a piston 20g and a spring 20h are provided in the reservoir chamber 20c. The piston 20g is connected to the rod 20f. The spring 20h pushes this piston 20g toward the ball valve 20d side and thus generates force to eject the brake fluid from the reservoir chamber 20c.

The pressure regulating reservoir 20 of the foregoing structure is designed such that, when a predetermined amount of brake fluid is stored in the pressure regulating reservoir 20, the ball valve 20d is forced to sit against a valve seat 20e so that brake fluid can not flow into the pressure regulating reservoir 20. Accordingly, it is not possible for an amount of brake fluid that exceeds the suction capability of the pump 19 to flow into the reservoir chamber 20c, so high pressure is not applied to the suction port side of the pump 19.

Meanwhile, as mentioned above, the structure of the second brake system 50b is substantially identical to the first brake system 50a. That is, the first differential pressure control valve 16 and the check valve 16a corresponds to a second differential pressure control valve 36 and a check valve 36a. The first and second pressure increase control valves 17, 18 and the check valves 17a, 18a respectively correspond to third and fourth pressure increase control valves 37, 38 and check valves 37a, 38a, and the first and second pressure decrease control valves 21, 22 respectively correspond to third and fourth pressure decrease control valves 41, 42. The pressure regulating reservoir 20 and elements 20a to 20h thereof corresponds to a pressure regulating reservoir 40 and elements 40a to 40h thereof. The pump 19 and the check valve 19a corresponds to a pump 39 and a check valve 39a. The damper 23 corresponds to a damper 43. Also, the conduits A, B, C, D respectively correspond to conduits E, F, G, H. This completes the description of the configuration of a hydraulic brake structure in the vehicle brake control device 1.

The brake ECU 70 corresponds to an electronic control mechanism, and is configured by a known micro-computer that includes a CPU, a ROM, a RAM, an I/O port and the like. The brake ECU 70 performs processing including various calculations in accordance with programs stored in the ROM or the like.

Based upon electric signals from the brake ECU 70, voltage application control is performed for the motor 60 in order to drive the control valves 16 to 18, 21, 22, 36 to 38, 41, 42 and the pumps 19, 39 of the brake fluid pressure control actuator 50 configured as described above. The W/C pressure generated for the W/Cs 14, 15, 34, 35 is thus controlled accordingly.

During ABS control and the like, for example, control voltage is applied by the brake ECU 70 to the motor 60 and solenoids for driving electromagnetic valves in the brake fluid pressure control actuator 50. Once applied, the control valves 16 to 18, 21, 22, 36 to 38, 41, 42 in the brake fluid pressure control actuator 50 are driven in accordance with the applied voltage to set a route for the brake conduit. Brake fluid pressure is generated for the W/Cs 14, 15, 34, 35 in accordance with the set brake conduit route so as to control the braking force generated for each wheel.

At non-braking times when the brake pedal 11 is not operated by the driver, the brake fluid pressure control actuator 50 can automatically apply pressure to the W/Cs 14, 15, 34, 35 through the application of voltage to the motor 60, with the first and second differential pressure control valves 16, 36 set to the differential pressure state, and the suction and discharge of brake fluid inside the M/C 13 by the pumps 19, 39. In this case, it is possible to generate braking force to only the driving wheels provided that the first and second pressure increase control valves 17, 18 corresponding to the driving wheels, i.e., the rear left wheel RL and the rear right wheel RR, are in the open state and not energized, while the third and fourth pressure increase control valves 37, 38 corresponding to the driven wheels, i.e., the front left wheel FL and the front right wheel FR, are in the closed state and energized. The distribution of braking force to the front wheels FL, FR and the rear wheels RL, RR can also by appropriately adjusted by adjusting the amount of current applied to the first and second differential pressure control valves 16, 36 such that the amounts of differential pressure generated thereby are different values.

The vehicle brake control device 1 also includes wheel speed sensors 71 to 74. The wheel speed sensors 71 to 74 are located in the corresponding wheels FL, FR, RL, RR. The wheel speed sensors 71 to 74 output respective pulse signals with pulse numbers that are proportional to the respective rotation speeds of the wheels FL, FR, RL, RR, namely, the wheel speeds, to the brake ECU 70. The brake ECU 70 uses the detection signals from the wheel speed sensors 71 to 74 to derive the wheel speed of each vehicle wheel FL, FR, RL, RR and the vehicle body speed (estimated vehicle body speed), and then uses the derived wheel and vehicle body speeds to perform ABS control and the like. Note that the brake ECU 70 uses a known method to calculate the vehicle body speed and thus a description of this method will be omitted here.

In the vehicle brake control device 1, the brake ECU 70 receives various information from an engine ECU 80 via a LAN in the vehicle for example.

The engine ECU 80 is configured by a known microcomputer that includes a CPU, a ROM, a RAM, an I/O port and the like. The brake ECU 70 performs engine control in accordance with programs stored in the ROM or the like.

The engine ECU 80, for example, performs controls for a throttle control device, a fuel injection device and the like in an engine mounted in the vehicle. The engine ECU 80 uses a pedal sensor 82 to detect an operation amount of an accelerator pedal 81 functioning as an accelerator operation member that corresponds to a drive request from the driver. The engine ECU 80 outputs a control signal to the throttle control device, fuel injection device and the like so as to achieve an engine output (engine torque) corresponding to the operation amount.

At times when a gear position is set to a drive range or a first or second speed range, the engine ECU 80 controls the engine output to generate an engine output equivalent to creep torque, such that the vehicle travels at a creep speed when the accelerator pedal is not being operated by the driver, or when accelerator pedal operation is not enough to reach a speed approximately equal to or greater than a predetermined creep speed.

Here, creep torque is defined as a force from the engine that is applied to a drive shaft via a transmission and a differential so as to advance the vehicle at creep speed. The creep torque is calculated by the engine ECU 80, for example, and may be equivalent to a product of the engine output (engine torque) multiplied by a transmission gear ratio and a differential gear ratio. More specifically, the engine ECU 80 calculates a required engine output for generating creep torque, and a desired creep torque is obtained by controlling the throttle control device, the fuel injection device and the like.

The creep torque varies depending on an engine load. During times of faster idling, such as immediately after the engine is started and while an air conditioner is running, the creep torque is set to a greater value than during times of normal idling when an engine speed is stable. Note that the specific method for calculating the creep torque is in general use and thus a description of this method will be omitted here. The engine ECU 80 subsequently outputs a control signal to generate the creep torque so as to drive the throttle control device, the fuel injection device and the like.

The engine ECU 80 handles various information related to engine control as described above. Various information including information related to the creep torque (or information related to the engine output equivalent to the creep torque) and information related to the operation amount of the accelerator pedal 81 is transmitted from the engine ECU 80 to the brake ECU 70.

This completes the description of the structure of the vehicle brake control device 1 of the present embodiment. Next, the operation of the vehicle brake control device 1 will be explained.

Before describing the operation of the vehicle brake control device 1 of the present embodiment, however, the reasons for performing such an operation will be explained.

Figure 3:
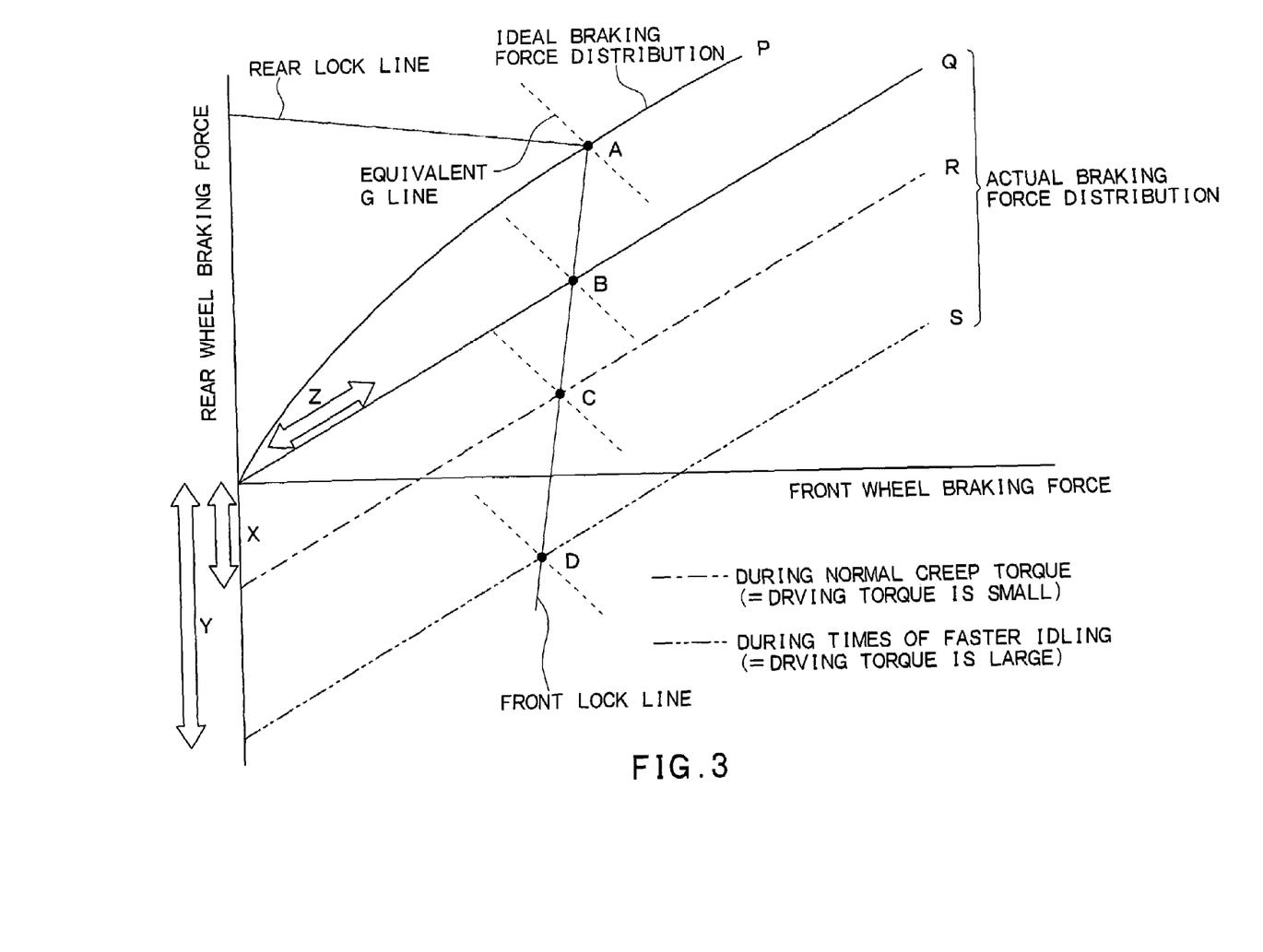
FIG. 3 is a drawing illustrating the relationship between an ideal braking force distribution diagram and an actual braking force distribution diagram, where the horizontal axis is a front wheel braking force and the vertical axis is a rear wheel braking force.

FIG. 3 illustrates the relationship between an ideal braking force distribution diagram and an actual braking force distribution diagram, where the horizontal axis is a front wheel braking force and the vertical axis is a rear wheel braking force. Note that the ideal braking force distribution diagram represents an ideal form of braking force distribution for the front and rear wheels, and the actual braking force distribution diagram purely represents the braking force that can be generated by the vehicle brake control device 1.

The actual braking force distribution depends upon the brake effect of brake mechanisms respectively provided for the front wheels FL, FR and the rear wheels RL, RR. In general, the stability of the vehicle is significantly affected if the rear wheels RL, RR have a tendency to lock up before the front wheels FL, FR. In order to avoid this, the distribution of braking force for the front wheels FL, FR is thus greater than for the rear wheels RL, RR.

For this reason, generating the same W/C pressure for the respective W/Cs 14, 15, 34, 35, as in the case of normal braking, shifts the braking force distribution from the lower left part of the actual braking force distribution diagram to the upper right part. It should be noted that the ideal braking force distribution line exceeds the rear wheel side in a high deceleration region. But in such a case, a control normally known as EBD (Electronic Brake force Distribution) that suppresses the braking force of the rear wheels ensures that the rear wheels RL, RR do not lock up.

The actual braking force distribution is the braking force actually generated for the respective front wheels FL, FR and the rear wheels RL, RR. Therefore, if driving force is generated by the driving wheels (which are the rear wheels RL, RR in the case of the present embodiment), note that the actual braking force distribution will vary depending on such driving force. In other words, the actual braking force for the driving wheels excludes the driving force from the braking force in accordance with the brake effect.

Therefore, if driving force such as creep torque is applied to the driving wheels, the actual braking force distribution is translated in a negative direction along the axis of the driving wheels for an amount corresponding to the creep torque. For a rear-wheel drive vehicle as in the present embodiment, as FIG. 3 shows, the application of creep torque to the rear wheels RL, RR, i.e., the driving wheels, translates the actual braking force distribution in the negative direction along the vertical axis for an amount corresponding to the creep torque.

The shifted amount is a value that converts the creep torque into driving force, namely, a value that decreases the amount of braking force.

As mentioned above, the creep torque here varies depending on the engine load. During times of faster idling, such as immediately after the engine is started and while the air conditioner is running, the creep torque is set to a greater value than during times of normal idling when an engine speed is stable.

A request for faster idling may occur if the engine is not sufficiently warmed up or if devices that affect engine load such as the air conditioner are being driven. If X is a value that converts the creep torque to driving force when there is no request for faster idling, and Y is a value that converts the creep torque to driving force where there is a request for faster idling, then naturally Y>X. Here, Y varies depending on a degree of the request for idling.

In the same manner, a single-dashed line and a double-dashed line in FIG. 3 respectively show the actual braking force distribution when X represents a value for normal creep torque where there is no faster idling request, and when Y represents that for faster idling. Accordingly, the actual braking force distribution varies as the creep torque increases, and the braking force for the front wheels FL, FR becomes relatively stronger than the braking force for the rear wheels RL, RR. However, a braking force balance that is biased toward the front wheels is accompanied by adverse effects such as the following. Such adverse effects will be explained below using two examples of a low μ road and a downward slope road.

(Adverse Effects on a Low μ Road)

Adverse effects in the case of a low μ road will be explained first. Cold regions often tend to have frozen low μ roads and low air temperatures, and idling is also faster when the engine is started. Therefore, the creep torque increases similar to the value Y during faster idling.

The same W/C pressure is thus generated for the respective wheels through normal braking to maintain a constant creep speed in this case. The actual braking force distribution consequently shifts from the lower left to the upper right as shown by a double-dashed line S in FIG. 3.

Meanwhile, a limit to the deceleration that can be generated is relatively small under conditions where there is a wheel lock-up limit based upon a road surface μ and a frozen low μ road as in cold regions. For example, assume the vehicle is traveling on a μ road surface where the maximum deceleration is generated at point A of the ideal braking force distribution in FIG. 3. That is, assume the vehicle is traveling on a μ road surface where the maximum achievable deceleration is that when the braking force defined at point A of the ideal braking force distribution is respectively generated for the front wheels FL, FR and the rear wheels RL, RR. If the vehicle is traveling on such a road surface, then the actual braking force distribution that can be generated—assuming that no creep torque is being generated—is point B.

In this case, a front lock line that represents a boundary for whether the front wheels FL, FR will lock up is a straight line that extends diagonally left and downward from point A. The front lock line is inclined and not parallel to the vertical axis because the lock limit also becomes higher as the load on the front wheels FL, FR increases. The load on the front wheels FL, FR increases in accordance with an increase in load at the front of the vehicle that increases when a deceleration increases. Also note that a straight line extending diagonally left and upward from point A is a rear lock line that represents a boundary for whether the rear wheels RL, RR will lock up. Contrary to the front lock line, the lock limit for the rear lock line becomes lower and the load on the rear wheels RL, RR decreases as deceleration increases.

As evident from the front lock line, lock-up of the front wheels FL, FR is more likely to occur at a lower deceleration farther downward along the actual braking force distribution line in FIG. 3. Accordingly, if the actual braking force distribution ignoring creep torque at the limit where the front wheels FL, FR do not lock up is indicated by point B, then a limit when the magnitude of creep torque is considered changes from point C to point D and gradually becomes smaller.

In cases where the actual braking force distribution shifts on top of the line S as explained above, the front wheels FL, FR will lock up at point D. However, there is negative braking force acting on the rear wheels RL, RR in such case, and thus the driving force still overcomes the braking force. This causes an imbalance of braking force to the front and rear wheels and result in a possible inability to control the vehicle to a desired creep speed.

In order to avoid such a situation, the braking force to the rear wheels RL, RR, i.e., the driving wheels, should be increased in accordance with the magnitude of creep torque. Fluctuations in the actual braking force distribution caused by creep torque can therefore be reduced or cancelled. In so doing, the actual braking force distribution when creep torque does occur as shown by a line R or the line S in FIG. 3 can approach the actual braking force distribution when there is no creep torque as shown by a line Q. Consequently, the lock limit for the front wheels FL, FR also shifts from point D to point B, and the vehicle deceleration in such case can also be increased.

However, to maintain a constant creep speed in reality, braking force to the rear wheels RL, RR is generated such that enough driving force remains to take into account an air resistance of the vehicle and a frictional resistance of the vehicle that is generated between tire and road surface. For this reason, an increase in the braking force to the rear wheels RL, RR may not necessarily coincide with a driving force equivalent to the creep torque values X, Y, but does substantially coincide therewith.

It should be noted that a dashed line in FIG. 3 represents an equivalent G line, and shows a braking force distribution required to obtain the same vehicle deceleration. The vehicle deceleration to be obtained decreases with successive shifts of this line downward in the figure.

(Adverse Effects on a Downward Slope Road)

Adverse effects in the case of a downward slope road will be explained next. As mentioned above, fluctuations caused by creep torque in the actual braking force distribution to the rear wheels RL, RR, i.e., the driving wheels, should be reduced or cancelled. This enables the actual braking force distribution to approach the ideal braking force distribution. In other words, the driving force of the rear wheels RL, RR may be increased such that driving force equivalent to the value X for normal creep torque when there is no faster idling request, or driving force equivalent to the value Y for creep torque when there is a faster idling request is reduced or canceled.

This practice is effective in the case of a flat or upward slope road, where reducing or canceling the creep torque means the vehicle loses the force to move forward; however, the same cannot necessarily be said in the case of a downward slope road where force generated due to gravity moves the vehicle (hereinafter referred to as "gravity impellent"). Namely, a gravity impellent is generated in the case of a downward slope road, so that even if the creep torque is reduced or canceled, the vehicle accelerates due to the gravity impellent and it becomes impossible to maintain a constant creep speed.

Thus for a downward slope road, the gravity impellent must be taken into account as part of the driving force and the braking force to the rear wheels RL, RR should be increased so as to reduce or cancel this additional amount of driving force. However, simply continuing to increase the braking force to the rear wheels RL, RR may also result in the rear wheels RL, RR locking up. Such a risk becomes even greater when the limit to lock up of the rear wheels RL, RR is low, as in the case of a low μ road. Once this situation occurs, the stability of the vehicle is significantly affected as explained above, and counteracts a setting meant to ensure that the rear wheels RL, RR do not lock up before the front wheels FL, FR.

In order to avoid such a situation, all the braking force required for reducing or canceling the creep torque and the gravity impellent may be applied to the rear wheels RL, RR. In such case, any amount by which such braking force exceeds the ideal braking force distribution line on the rear wheel side is distributed to the front wheels FL, FR and the rear wheels RL, RR. For example, if the braking force distribution of the front wheels FL, FR and the rear wheels RL, RR is set as shown by an arrow Z in FIG. 3 along the actual braking force distribution shown by the line Q, then the ideal braking force distribution line on the rear wheel side is not exceeded. Therefore, a constant creep speed is possible while maintaining the stability of the vehicle.

The above holds true during times of non-braking as well as during braking. For non-braking, the values X, Y converting the creep torque into driving force are replaced by an amount of driving force that generates the creep speed. Therefore, the creep torque when there is a faster idling request is greater than normal creep torque when there is no faster idling request, thereby increasing the creep speed.

Likewise, fluctuations in creep torque are thus taken into account even during times of non-braking and braking force is applied to the rear wheels RL, RR, i.e., the driving wheels. In this manner, fluctuations in creep speed caused by creep torque can be reduced or canceled.

Figure 4:
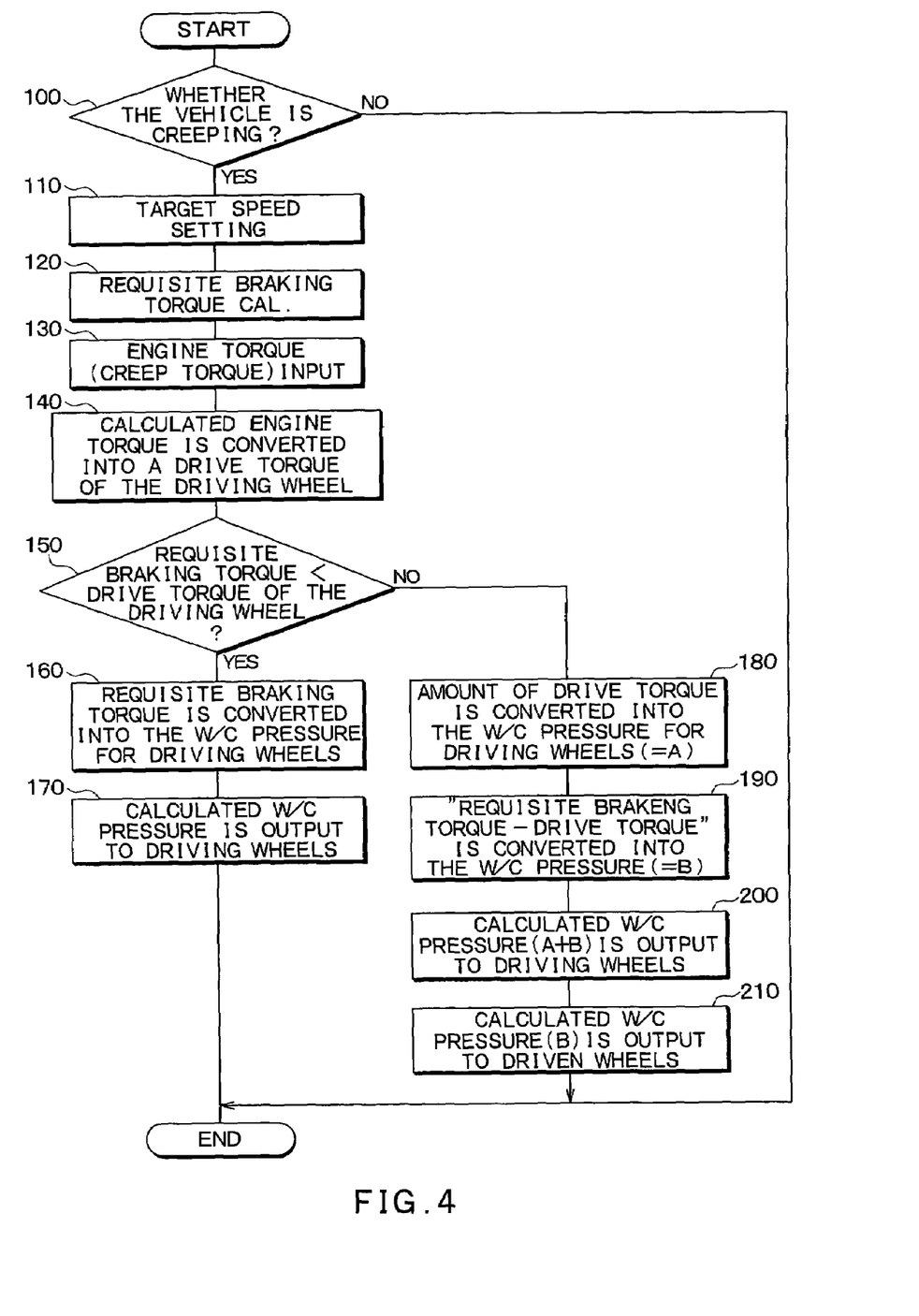
FIG. 4 is a flow chart illustrating braking force control processing that is executed by a brake ECU in the vehicle brake control device.

Based upon the foregoing considerations, operations such as the following are performed in the vehicle brake control device 1 of the present embodiment. FIG. 4 is a flow chart illustrating braking force control processing that is executed by the brake ECU 70 in the vehicle brake control device 1. The processing shown in this figure is executed at predetermined calculation cycles, for example, when an ignition switch (not shown) is turned ON.

It is first determined at 100 whether the vehicle is creeping. A unit within the brake ECU 70 that performs such processing corresponds to a creep determination unit and also includes a vehicle body speed detection unit. Whether the vehicle is creeping or not is determined based upon various information transmitted from the engine ECU 80 to the brake ECU 70, and a speed of a vehicle (vehicle body speed) calculated by the brake ECU 70. More specifically, information related to the operation amount of the accelerator pedal 81, which is handled by the engine ECU 80, is used for the determination. The vehicle is determined to be creeping if the accelerator pedal 81 is not being operated and the vehicle body speed is equal to or less than a predetermined value. Note that another routine (not shown) such as ABS control processing or the like is generally performed in the brake ECU 70 with regard to the vehicle body speed, and the calculation result thus found is used here.

If it is determined that the vehicle is creeping, then the routine proceeds to processing at 110. However, if it is determined that the vehicle is not creeping, then there is no need to generate braking force for the driving wheels, and the processing is ended. Power to the first differential pressure control valve 16 is subsequently turned OFF and a motor relay is turned OFF, such that the first differential pressure control valve 16 is set to the open state and the motor 60 is turned OFF.

At 110, a target speed is set. A unit within the brake ECU 70 that performs such processing corresponds to a target vehicle speed setting unit. The target speed used here is set as a target creep speed. The target speed may be set to a value that is determined depending on the vehicle model and the like, and may also be a value that varies depending on various conditions such as a vehicle running condition. Note that a method similar to that employed in the above-mentioned Japanese Patent Application Publication No. JP-A-2004-90679 may be used with respect to changing the target speed in accordance with various conditions.

The routine next proceeds to processing at 120, and a requisite braking torque is derived from the target speed and an actual vehicle speed calculated by the brake ECU 70. A unit within the brake ECU 70 that performs such processing corresponds to a requisite braking torque calculation unit. Namely, if there is a difference between the target speed and the actual vehicle speed, then braking force is applied to reduce the difference. Since the requisite braking torque for reducing the difference between the target speed and the actual vehicle speed is calculated in this manner, it is possible to calculate a requisite braking torque for maintaining a constant creep speed on not only flat roads and upward slope roads, but also on downward slope roads.

Braking torque corresponding to the braking force required at this time is calculated as the requisite braking torque. The braking force that is found here changes in accordance with a control method, that is, the type of control method in which the actual vehicle speed approaches the target speed. In the case of PID control, for example, the braking force may be determined depending on where emphasis is given to the controls for P, I or D. Note that the control state used here may be any one of various controls currently in use and widely known, and thus a description of the control state is omitted here.

At 130, an engine torque (creep torque) is input. A unit within the brake ECU 70 that performs such processing corresponds to an engine torque detection unit. For example, information related to the engine torque (engine output) that is handled by the engine ECU 80 may be used without change. Subsequently at 140, the engine torque calculated at 130 is converted into a drive torque of the driving wheel. More specifically, the drive torque of the driving wheel, i.e., the creep torque, can be calculated by multiplying the engine torque, the transmission gear ratio and the differential gear ratio.

It should be noted that although the creep torque is derived from the engine torque here, the creep torque itself may also be used without change as the drive torque of the driving wheel if such information is handled by the engine ECU 80. A unit within the brake ECU 70 that performs such processing to calculate the drive torque of the driving wheel corresponds to a driving wheel drive torque conversion unit.

Once the requisite braking torque and the drive torque of the driving wheel are thus calculated, the routine proceeds to processing at 150, where it is determined whether the requisite braking torque is less than the drive torque of the driving wheel. If the determination is YES, then the routine proceeds to processing at 160, which is performed in order to generate braking force for the driving wheels. Note that in the case of a flat road or an upward slope road, the determination will almost always be affirmative.

At 160, the requisite braking torque is first converted into the W/C pressure for the rear wheels RL, RR, i.e., the driving wheels. This W/C pressure corresponds to a W/C pressure required to generate braking force equivalent to the amount of creep torque. This conversion determines how much brake fluid pressure should be generated for the W/Cs 14, 15 that correspond to the driving wheels in order to maintain a constant creep speed. Thus the specific W/C pressure that should be generated for the W/Cs 14, 15 is calculated.

At 170, output is performed to generate the W/C pressure calculated at 160 for the W/Cs 14, 15 that correspond to the driving wheels. More specifically, the W/C pressure is first converted into a control current. This conversion determines how much current should be applied to the first and second differential control valves 16, 36 in order to generate the above W/C pressure to the rear wheels RL, RR, i.e., the driving wheels. In other words, during non-braking, the value of current to be applied to the first differential pressure control valve 16 is calculated, because the W/C pressure to the rear wheels RL, RR is generated by applying current to only the first differential pressure control valve 16 to generate a differential pressure state, such that the value of differential pressure is equivalent to the above W/C pressure. During braking, however, the current value for the first differential pressure control valve 16 is calculated so as to be set greater than the current value for the second differential pressure control valve 36, that is, the current value is calculated so as to generate a differential pressure in the first differential pressure control valve 16 that is greater than that for the second differential pressure control valve 36. This is because braking force is also generated for the front wheels FL, FR during braking, and the brake fluid pressure applied to the rear wheels RL, RR must be greater than the brake fluid pressure applied to the front wheels FL, FR, by an amount equivalent to the above W/C pressure.

Note that with regard to the current values for the first and second differential pressure control valves 16, 36 during braking, when it is in normal braking at which ABS control and the like is not performed, there is no current to the first and second differential pressure control valves 16, 36. Therefore, a current value equivalent to a control fluid pressure for the first differential pressure control valve 16 is basically calculated as a control current. In this case, the brake fluid pressure generated by depressing the brake pedal is applied to the front wheels FL, FR, i.e., the driven wheels, regardless of any increase in creep torque. Moreover, in addition to the brake fluid pressure generated by depressing the brake pedal, the amount of differential pressure generated in the first differential pressure control valve 16 is applied to the rear wheels RL, RR, i.e., the driving wheels.

Thereafter, the calculated control current is output to the first differential pressure control valve 16, and a control signal to turn the motor relay ON is output in order to drive the motor 60.

Thus during times of non-braking, the brake fluid pressure for the amount of differential pressure generated in the first differential pressure control valve 16 is applied to the W/Cs 14, 15. Therefore, braking force corresponding to the amount of creep torque is generated, whereby variations in the creep speed are canceled. It is therefore possible to maintain a constant creep speed.

During braking as well, a brake fluid pressure higher than that to the W/Cs 34, 35 of the front wheels FL, FR by the amount of difference between the differential pressure caused by the first differential pressure control valve 16 and the differential pressure caused by the second differential pressure control valve 36, is applied to the W/Cs 14, 15 of the rear wheels RL, RR. Accordingly, braking force to which the creep torque has been added can be generated for the rear wheels RL, RR. The braking force distribution to the driving wheels and the driven wheels can thus be suitably set, thereby ensuring that the driven wheels do not easily lock up on a low μ road surface or the like.

Meanwhile, if the determination is NO at 150, then a requisite braking torque greater than the amount of drive torque of the driving wheel is considered necessary, and the routine proceeds to processing at 180. When a gravity impellent acts on the vehicle as in the case of a downward slope road, the requisite braking torque is approximately the amount of creep torque plus the impellent. Therefore, a negative determination will be highly obtained at 150.

At 180, the amount of drive torque included in the requisite braking torque is converted into the W/C pressure for the rear wheels RL, RR, i.e., the driving wheels. This W/C pressure is substantially equivalent to a W/C pressure required in order to generate a braking force equivalent to the actual amount of creep torque. This conversion determines how much brake fluid pressure should be generated for the W/Cs 14, 15 that correspond to the driving wheels in order to cancel the creep torque. The W/C pressure at this time is a conversion value A.

At 190, the remaining requisite braking torque from which the drive torque has been subtracted (requisite braking torque—drive torque) is converted into a W/C pressure that is respectively distributed to the rear wheels RL, RR, i.e., the driving wheels, and the front wheels FL, FR, i.e., the driven wheels. More specifically, the calculated W/C pressure for the front and rear wheels is identical when the W/C pressure for the front and rear wheels is set along the actual braking force distribution line shown by the line Q as explained above. The W/C pressure at this time is a conversion value B.

Thereafter, the routine proceeds to processing at 200, where output is performed to generate the sum (A+B) of the respective W/C pressures calculated at 180 and 190 for the W/Cs 14, 15 that correspond to the rear wheels RL, RR, i.e., the driving wheels. More specifically, the sum (A+B) of the W/C pressure is converted into a control current, and such calculated control current is then output to the first differential pressure control valve 16.

The routine subsequently proceeds to processing at 210, where output is performed to generate the W/C pressure (=B) calculated at 190 for the W/Cs 34, 35 that correspond to the front wheels FL, FR, i.e., the driven wheels. More specifically, the W/C pressure (=B) calculated at 190 is converted into a control current, and such calculated control current is output to the second differential pressure control valve 36. In addition, a control signal to turn the motor relay ON is output in order to drive the motor 60.

Thus during times of non-braking, with regard to the rear wheels RL, RR, brake fluid pressure for the amount of differential pressure in the first differential pressure control valve 16 is applied to the W/Cs 14, 15. Therefore, braking force is generated that is equivalent to the sum of the creep torque and the gravity impellent. However, with regard to the front wheels FL, FR, brake fluid pressure for the amount of differential pressure in the second differential pressure control valve 36 is applied to the W/Cs 34, 35. Therefore, braking force is generated that is approximately equivalent to the gravity impellent. Creep torque is thus canceled by the braking force equivalent to the creep torque, which is applied to the rear wheels RL, RR, and the gravity impellent is canceled by the braking force equivalent to the gravity impellent, which is applied to both the rear wheels RL, RR and the front wheels FL, FR. It is therefore possible to maintain a constant creep speed.

Note that a unit within the brake ECU 70 that sets the braking torque distribution for the respective wheels FL, FR, RL, RR as explained in the processing at 150 to 210 corresponds to a wheel braking torque distribution setting unit.

As explained above, the vehicle brake control device 1 of the present embodiment determines whether the requisite braking torque is less than the drive torque of the driving wheel. Based upon this determination, the vehicle brake control device 1 is designed to switch between either generating braking force for only the rear wheels RL, RR, i.e., the driving wheels, or generating braking force for the front wheels FL, FR, i.e., the driven wheels, in addition to that for the rear wheels RL, RR.

Accordingly, it is possible to maintain the creep speed to the target speed and achieve a suitable front and rear braking force distribution on downward slope roads where a gravity impellent is acting on the vehicle, as well as on flat roads and upward slope roads. The ability to achieve such a suitable front and rear braking force distribution ensures that the driven wheels will not easily lock up on a low μ road surface or the like.

Other Embodiments (1) The above embodiment described a configuration in which the brake ECU 70 and the engine ECU 80, which are control units in the present invention, are separate. However, another possible configuration may integrate these into one, such that the brake control and the engine control are performed by one ECU. In particular, performing not only the brake control and the engine control, but all controls, with one integrated ECU has been studied in recent years, and such a configuration may also be used. Naturally a configuration in which other ECUs in place of the brake ECU 70 and the engine ECU 80 are used to perform the respective processing described above is also possible.

(2) In the above embodiment, the vehicle body speed calculation is performed by the brake ECU 70. However, if the vehicle body speed is found by another ECU provided in the vehicle, then the vehicle body speed may be obtained therefrom via a AN in vehicle or the like. In addition, the vehicle body speed was calculated from the detection signals of wheel speed sensors 71 to 74. However, if the vehicle is provided with a vehicle speed sensor, then the vehicle body speed can also be calculated using a detection signal of the vehicle speed sensor. Note that a unit corresponding to a vehicle body speed detection unit would be used in cases where the brake ECU 70 receives a signal (information) related to the vehicle body speed in this manner.

(3) In the above embodiment, the brake fluid pressure control actuator 50 provided in the vehicle brake control device 1 functions as a brake control actuator. The brake fluid pressure control actuator 50 uses brake fluid pressure to apply pressure to the wheels cylinders 14, 15, 34, 35, and has hydraulic circuits that generate braking force for the driving wheels and the driven wheels. However, an electric brake may be provided that electrically applies pressure to the respective W/Cs 14, 15, 34, 35. In such case, for example, a motor or the like that applies pressure to the respective W/Cs 14, 15, 34, 35 based upon a control signal output from the brake ECU 70 corresponds to the brake control actuator.

(4) The above embodiment described an example using a rear-wheel drive vehicle, however, the present invention may be similarly applied to a front-wheel drive vehicle and a four-wheel drive vehicle.

(5) The description of the above embodiment assumed a case in which the same drive torque of the driving wheel is respectively generated for the rear wheels RL, RR in a rear-wheel drive vehicle. However, there are vehicles in which a control is performed so as to actively vary the distribution of drive torque for each driving wheel. In such case, the braking force generated for each wheel may be varied so that the drive torque for each wheel can be reduced or canceled. Naturally in the case of a four-wheel drive vehicle using a configuration where the distribution of drive torque to the four wheels is actively varied, the braking force for each of the wheels may be varied in accordance with the respective drive torque for the four wheels. In particular, a control that generates different respective braking forces for the four wheels can be performed with ease by employing an electric brake as mentioned above.

The braking force for each wheel may be set so as to correspond to the driving force for each wheel as described above. When such driving force is cancelled in this manner, the tire grip of each wheel is such that there is no longitudinal force generated in a friction circle where a vertical axis is longitudinal force (driving force, braking force) acting on the tire and a horizontal axis is lateral force (side force). Therefore, a state can be achieved that fully exploits the side force to obtain an effect capable of contributing to the stabilization of future vehicle behavior.

While the above description is of the preferred embodiments of the present invention, it should be appreciated that the invention may be modified, altered, or varied without deviating from the scope and fair meaning of the following claims.

What is claimed is:

1. A vehicle brake control device, comprising:
   a braking force generation unit that generates a braking force to wheels in a vehicle by generating a braking torque corresponding to the respective wheels;
   a brake control actuator that generates a braking torque for the braking force generation unit in accordance with operation of a brake operation member by a driver; and
   an electronic control unit that controls the braking torque generated by the braking force generation unit through output of a control signal to the brake control actuator, wherein the electronic control unit comprises:
   a vehicle body speed detection unit that detects a vehicle body speed;
   a target speed setting unit that sets a target speed for the vehicle body speed;
   a requisite braking torque calculation unit that calculates a requisite braking torque, which is required as a braking torque to be generated by the braking force generation unit, such that the vehicle body speed detected by the vehicle body speed detection unit reaches the target speed set by the target speed setting unit;
   an engine torque detection unit that detects an engine torque transmitted to driving wheels among the respective wheels;
   a driving wheel drive torque conversion unit that converts the engine torque detected by the engine torque detection unit into a drive torque that is applied to the driving wheels; and
   a braking torque distribution setting unit for the respective wheels that sets a distribution of the requisite braking torque to the respective wheels depending on a magnitude of the drive torque calculated by the driving wheel drive torque conversion unit, wherein the control signal is output to the brake control actuator so as to achieve a distribution of the requisite braking torque to the respective wheels as set by the braking torque distribution setting unit for the respective wheels, the braking torque distribution setting units for the respective wheels include a comparison unit that determines whether the requisite braking torque is less than the drive torque, the requisite braking torque is distributed to only the driving wheels of the respective wheels if the comparison unit determines that the requisite braking torque is less than the drive torque, and if the comparison unit determines that the requisite braking torque is equal to or greater than the drive torque, a first braking torque, which is equivalent to the drive torque, is distributed to the driving wheels, and a second braking torque, which is equivalent to a difference between the requisite braking torque and the drive torque, is distributed to the driving wheels and the driven wheels.

2. The vehicle brake control device according to claim 1, wherein the electronic control unit includes a creep determination unit that determines whether the vehicle is creeping, and the braking torque distribution setting units for the respective wheels set a distribution of the requisite braking torque to the respective wheels if it is determined by the creep determination unit that the vehicle is creeping.

3. The vehicle brake control device according to claim 1, wherein the creep determination unit includes an accelerator operation detection unit that detects operation of an accelerator operation member by a driver, and the creep determination unit determines that the vehicle is creeping if the vehicle body speed detected by the vehicle body speed detection unit is equal to or less than a predetermined speed and the accelerator operation detection unit detects no operation of the accelerator operation member.

4. The vehicle brake control device according to claim 1, wherein the brake control actuator is an actuator for brake fluid pressure control that is provided with a hydraulic circuit that transmits a brake fluid pressure from a brake fluid pressure generation source, which generates brake fluid pressure in accordance with operation of the brake operation member, to wheel cylinders;

the hydraulic circuit includes a first brake system that controls a brake fluid pressure to wheel cylinders corresponding to the driving wheels, and a second brake system that controls a brake fluid pressure to wheel cylinders corresponding to the driven wheels;

the first brake system is provided with a first differential pressure control valve that is configured by an electromagnetic valve, which generates a differential brake fluid pressure between the brake fluid pressure generation source and the wheel cylinders corresponding to the driving wheels;

the second brake system is provided with a second differential pressure control valve that is configured by an electromagnetic valve that generates a differential brake fluid pressure between the brake fluid pressure generation source and the wheel cylinders corresponding to the driven wheels;

the differential pressure to be generated can be increased in accordance with an increase in current values of the first and second differential pressure control valves; and the electronic control unit applies to the first differential pressure control valve a current with a current value greater than that for the second differential pressure control valve as the control signal, so as to generate a braking torque for the driving wheels that is greater than that for the driven wheels.

5. A vehicle brake control device, comprising:

a braking force generation unit that generates a braking force to wheels in a vehicle by generating a braking torque corresponding to the respective wheels;

a brake control actuator that generates a braking torque for the braking force generation unit in accordance with operation of a brake operation member by a driver; and an electronic control unit that controls the braking torque generated by the braking force generation unit through output of a control signal to the brake control actuator, wherein the electronic control unit comprises:

a vehicle body speed detection unit that detects a vehicle body speed;

a target speed setting unit that sets a target speed for the vehicle body speed;

a requisite braking torque calculation unit that calculates a requisite braking torque, which is required as a braking torque to be generated by the braking force generation unit, such that the vehicle body speed detected by the vehicle body speed detection unit reaches the target speed set by the target speed setting unit;

an engine torque detection unit that detects an engine torque transmitted to driving wheels among the respective wheels;

a driving wheel drive torque conversion unit that converts the engine torque detected by the engine torque detection unit into a drive torque that is applied to the driving wheels; and a braking torque distribution setting unit for the respective wheels that sets a distribution of the requisite braking torque to the respective wheels depending on a magnitude of the drive torque calculated by the driving wheel drive torque conversion unit, wherein the control signal is output to the brake control actuator so as to achieve a distribution of the requisite braking torque to the respective wheels as set by the braking torque distribution setting unit for the respective wheels, and the braking torque distribution setting unit determines whether the requisite braking torque is less than the drive torque, and if the requisite braking torque is less than the drive torque, the requisite braking torque is applied only to the driving wheels by the brake control actuator.

6. The vehicle brake control device according to claim 5, wherein the brake control actuator is an actuator for brake fluid pressure control that is provided with a hydraulic circuit that transmits a brake fluid pressure from a brake fluid pressure generation source, which generates brake fluid pressure in accordance with operation of the brake operation member, to wheel cylinders;

the hydraulic circuit includes a first brake system that controls a brake fluid pressure to wheel cylinders corresponding to the driving wheels, and a second brake system that controls a brake fluid pressure to wheel cylinders corresponding to the driven wheels;

the first brake system is provided with a first differential pressure control valve that is configured by an electromagnetic valve, which generates a differential brake fluid pressure between the brake fluid pressure generation source and the wheel cylinders corresponding to the driving wheels;

the second brake system is provided with a second differential pressure control valve that is configured by an electromagnetic valve that generates a differential brake fluid pressure between the brake fluid pressure generation source and the wheel cylinders corresponding to the driven wheels;

the differential pressure to be generated can be increased in accordance with an increase in current values of the first and second differential pressure control valves; and the electronic control unit applies to the first differential pressure control valve a current with a current value greater than that for the second differential pressure control valve as the control signal, so as to generate a braking torque for the driving wheels that is greater than that for the driven wheels.

7. A vehicle brake control device, comprising:

a braking force generation unit that generates a braking force to wheels in a vehicle by generating a braking torque corresponding to the respective wheels;

a brake control actuator that generates a braking torque for the braking force generation unit in accordance with operation of a brake operation member by a driver; and an electronic control unit that controls the braking torque generated by the braking force generation unit through output of a control signal to the brake control actuator, wherein the electronic control unit comprises:

a vehicle body speed detection unit that detects a vehicle body speed;

a target speed setting unit that sets a target speed for the vehicle body speed;

a requisite braking torque calculation unit that calculates a requisite braking torque, which is required as a braking torque to be generated by the braking force generation unit, such that the vehicle body speed detected by the vehicle body speed detection unit reaches the target speed set by the target speed setting unit;

an engine torque detection unit that detects an engine torque transmitted to driving wheels among the respective wheels;

a driving wheel drive torque conversion unit that converts the engine torque detected by the engine torque detection unit into a drive torque that is applied to the driving wheels; and a braking torque distribution setting unit for the respective wheels that sets a distribution of the requisite braking torque to the respective wheels depending on a magnitude of the drive torque calculated by the driving wheel drive torque conversion unit, wherein the control signal is output to the brake control actuator so as to achieve a distribution of the requisite braking torque to the respective wheels as set by the braking torque distribution setting unit for the respective wheels, and the vehicle brake control device is installed in a vehicle in which only two wheels are the driving wheels, and the braking torque distribution setting unit determines whether the requisite braking torque is less than the drive torque, and if the requisite braking torque is less than the drive torque, the requisite braking torque is applied only to the driving wheels by the brake control actuator.

8. The vehicle brake control device according to claim 7, wherein the brake control actuator is an actuator for brake fluid pressure control that is provided with a hydraulic circuit that transmits a brake fluid pressure from a brake fluid pressure generation source, which generates brake fluid pressure in accordance with operation of the brake operation member, to wheel cylinders;

the hydraulic circuit includes a first brake system that controls a brake fluid pressure to wheel cylinders corresponding to the driving wheels, and a second brake system that controls a brake fluid pressure to wheel cylinders corresponding to the driven wheels;

the first brake system is provided with a first differential pressure control valve that is configured by an electromagnetic valve, which generates a differential brake fluid pressure between the brake fluid pressure generation source and the wheel cylinders corresponding to the driving wheels;

the second brake system is provided with a second differential pressure control valve that is configured by an electromagnetic valve that generates a differential brake fluid pressure between the brake fluid pressure generation source and the wheel cylinders corresponding to the driven wheels;

the differential pressure to be generated can be increased in accordance with an increase in current values of the first and second differential pressure control valves; and the electronic control unit applies to the first differential pressure control valve a current with a current value greater than that for the second differential pressure control valve as the control signal, so as to generate a braking torque for the driving wheels that is greater than that for the driven wheels.

* * * * *